(12) United States Patent
Smyth et al.

(10) Patent No.: US 7,761,454 B2
(45) Date of Patent: Jul. 20, 2010

(54) DYNAMIC DIVERSITY-ENHANCED SIMILARITY RETRIEVAL SYSTEM AND METHOD

(75) Inventors: Barry Smyth, County Wicklow (IE); Lorraine McGinty, Dublin (IE)

(73) Assignees: University College Dublin National, Dublin (IE); University of Ireland, Dublin (IE)

(*) Notice: Subject to any disclaimer, the term of this patent is extended or adjusted under 35 U.S.C. 154(b) by 0 days.

(21) Appl. No.: 11/314,249

(22) Filed: Dec. 22, 2005

(65) Prior Publication Data

US 2006/0112087 A1 May 25, 2006

Related U.S. Application Data

(63) Continuation of application No. PCT/IE2004/000087, filed on Jun. 23, 2004.

(30) Foreign Application Priority Data

Jun. 23, 2003 (IE) .................................. 2003/0464

(51) Int. Cl.
*G06F 17/30* (2006.01)
(52) U.S. Cl. ....................................................... 707/749
(58) Field of Classification Search ........................ None
See application file for complete search history.

(56) References Cited

U.S. PATENT DOCUMENTS 5,630,122 A * 5/1997 Kaplan et al. ................... 707/4

| 6,744,935 | B2 * | 6/2004 | Choi et al. ................... 382/305 |
| 6,859,802 | B1 * | 2/2005 | Rui .............................. 707/5 |
| 7,130,849 | B2 * | 10/2006 | Yayoi et al. .................... 707/5 |
| 7,181,438 | B1 * | 2/2007 | Szabo ........................... 707/2 |
| 2004/0267740 | A1 * | 12/2004 | Liu et al. ...................... 707/3 |

FOREIGN PATENT DOCUMENTS

WO      WO03012684      2/2003

OTHER PUBLICATIONS

Title: A Case-Based Reasoning View of Automated Collaborative Filtering, Author: Conor Hayes, Padraig Cunningham, and Barry Smyth, Publication Date: 2001, Publisher: Springer-Verlag, Source: LNCS 2080, ICCBR 2001, pp. 234-248, ISBN: 3-540-42358-3.*

(Continued)

*Primary Examiner*—Mohammad Ali
*Assistant Examiner*—Syed H Hasan
(74) *Attorney, Agent, or Firm*—Jacobson Holman PLLC

(57) ABSTRACT

A conversational recommender system retrieves k cases (3) and generates a structure for user feedback (4). The structure includes a list of critique units for each of which the user can specify a value range. It also generates compound critiques, each being a combination of features and value ranges presented together. An explanation of a compound critique can be generated in response to a user request. The system determines (7), from one cycle of a session to the next, if a preference has been carried. If so, a re-focus function implementing diversity is used for retrieval in the next cycle. If not, a refine function implementary similarity-based retrieval is used for the next cycle of the session.

7 Claims, 8 Drawing Sheets

OTHER PUBLICATIONS

Title: Similarity vs. Diversity, Author: Barry Smyth and Paul McClave, Publication Date: 2001, Publisher: Springer-Verlag, Source: LNAI 2080, ICCBR 2001, pp. 347-361, ISBN:3-540-42358-3.*

Title: RABBIT: An Interface for Database Access, Author: Michael D. Williams and Frederich N. Tou, Publication Date: 1982, Publisher: ACM Press, Source: ACM/CSC-ER archive, Proceedings of the ACM '82 conference table of contents, pp. 83-87, ISBN: 0-89791-085-0.*

Shimazu, Artificial Intelligence Rev 18, 2002, pp. 223-244, ExpertClerk: A Conversational Case-Based Reasoning Tool for . . . .

McGinty et al, XP-002299769, 2002, pp. 1-15, retrieved from Internet; Comparison-Based Recommendation.

McGinty et al, XP-002299770, 2002, pp. 1-11, retrieved from Internet; Deep Dialogue vs Casual Conversation in Recommender . . . .

* cited by examiner

Fig.2

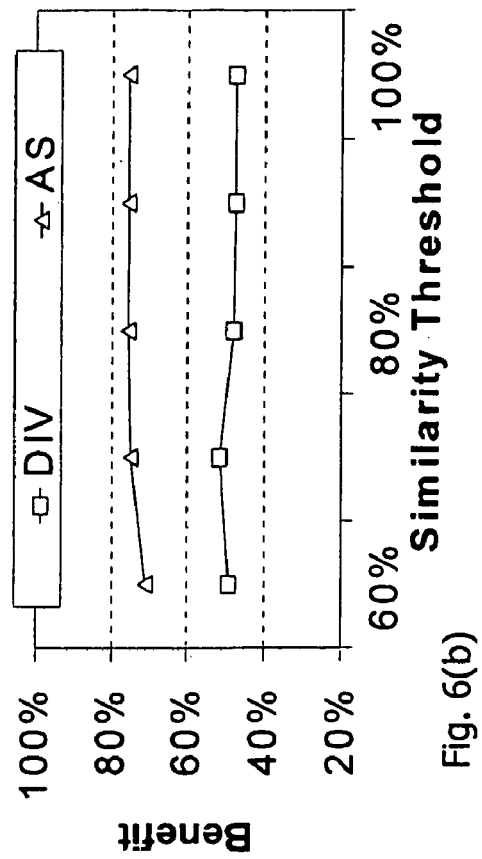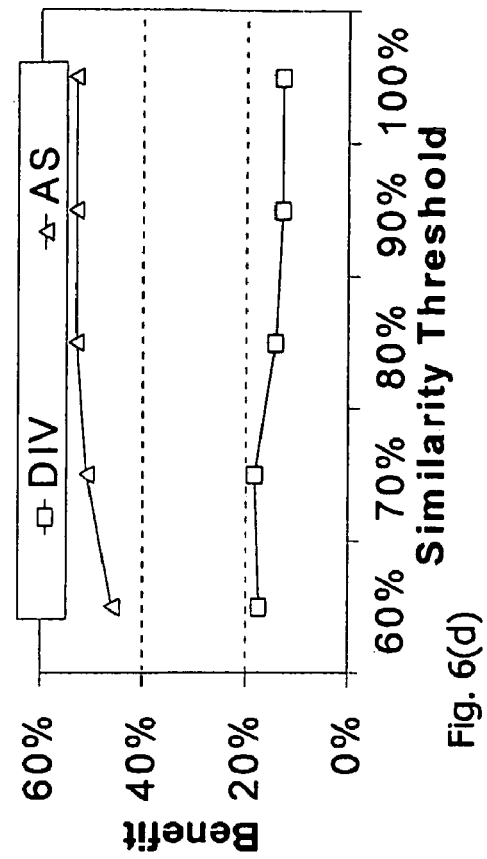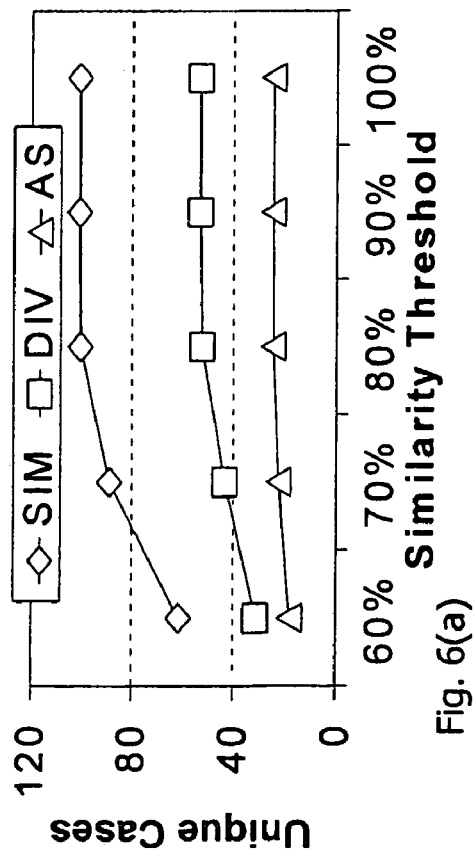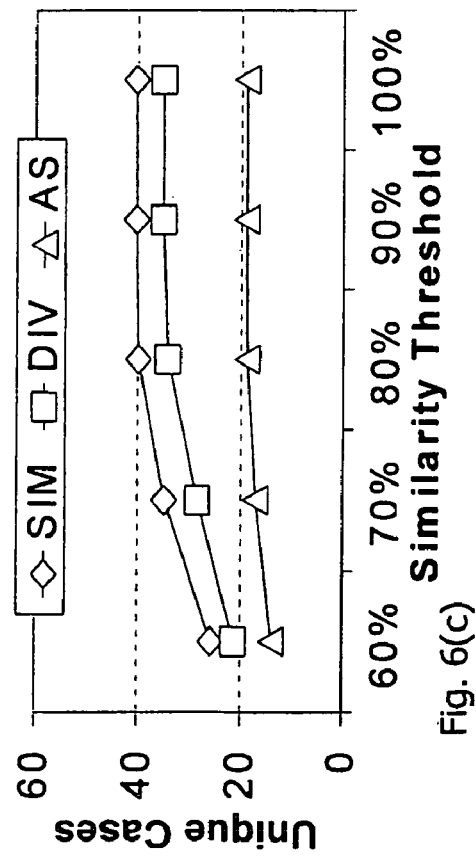

DYNAMIC DIVERSITY-ENHANCED SIMILARITY RETRIEVAL SYSTEM AND METHOD

This a continuation of PCT/IE04/000087 filed Jun. 23, 2004 and published in English.

INTRODUCTION

1. Field of the Invention

The invention relates to automatic retrieval of cases by search systems.

2. Prior Art Discussion

One of the key requirements of E-commerce systems and other search systems going forward is an ability to perform retrieval to locate a target case for a user as quickly as possible.

In recent years conversational recommender systems have been developed for iteratively retrieving cases in response to user feedback. The feedback is often preference-based, in which the user indicates a preferred one of the k cases retrieved in a particular cycle. The user may use other forms of feedback on top of a simple preference. For example, the user may rank or rate the retrieved cases, or the user may indicate a preferred value for a specific case feature (e.g. price=$1000), or critique/tweak a feature (e.g. price<$1000).

The primary basis of retrieval operations was previously to search for cases similar to the user request. However, more recently, it has been recognised that this process is often unsatisfactory and user frustration can arise where a number of cases are very similar to each other. A practical example is where a user is searching for holiday options according to certain criteria, and the recommender system retrieves options of vacations in three apartments of the same block. This problem led to development of diversity retrieval operations in which the recommender system ensures there is both similarity to the user request and diversity among the retrieved cases.

This approach generally reduces the number of cycles to the target case, however there is still scope for improvement, particularly where there are many product options and/or a large product space being searched.

STATEMENTS OF INVENTION

According to the invention, there is provided a retrieval method carried out by a conversational recommender system operating with user feedback in retrieval cycles to retrieve cases from a database, wherein in at least one retrieval cycle of a retrieval session the system dynamically chooses a selection mechanism.

In one embodiment, the dynamic choice is made on the basis of the user feedback in the relevant cycle.

In another embodiment, the choice is made on the basis of whether a preference case is carried from a previous cycle, and the user again prefers the same case in the current cycle.

In a further embodiment, the system chooses:
a refinement selection mechanism if a different preference is indicated;
a re-focusing selection mechanism for implementing diversity if the same preference is indicated.

In one embodiment, the refinement mechanism is based on similarity retrieval, without diversity.

In another embodiment, the re-focusing mechanism is based on diversity-enhanced similarity retrieval.

In a further embodiment, the system performs retrieval on the basis of case based reasoning.

In one embodiment, the system requests the user to provide feedback by specifying desired search feature values.

In another embodiment, the system requests the user to indirectly indicate a preferred case, by critiquing in which a range of values is indicated for a search feature.

In a further embodiment, the system dynamically generates a fresh feedback structure for user feedback in each cycle of a session.

In one embodiment, the system reviews cases that remain in the search space for a session and identifies groups of features, and value ranges, and automatically presents the user with an option to indicate suitability of these features and value ranges for a compound critique feedback.

In another embodiment, the system dynamically selects said features and value ranges by characterising recurring features and ranges as association rules A→B, in which from the presence of features, and value ranges A it infers the presence of other features and value ranges B.

In a further embodiment, the selection is executed by a process which measures the importance of a rule in terms of its support and confidence.

In one embodiment, the system generates a plurality of candidate compound critiques, grades them, and presents to the user only compound critiques having higher grades.

In another embodiment, the candidate compound critiques are graded according to a criterion of applicability to the user and a criterion of ability to reduce down the search space.

In a further embodiment, the system generates an explanation for each compound critique presented to the user.

In one embodiment, the user is presented with the option of choosing a compound critique or requesting an explanation.

The invention also provides a recommender system for implementing recommender systems operations of a method defined above.

DETAILED DESCRIPTION OF THE INVENTION

Brief Description of the Drawings

The invention will be more clearly understood from the following description of some embodiments thereof, given by way of example only with reference to the accompanying drawings in which:—

FIGS. 2 and 3 are sample screenshots; and

FIGS. 4 to 7 are sets of plots indicating efficiency of the retrieval method of the invention.

DESCRIPTION OF THE EMBODIMENTS

Figure 1:
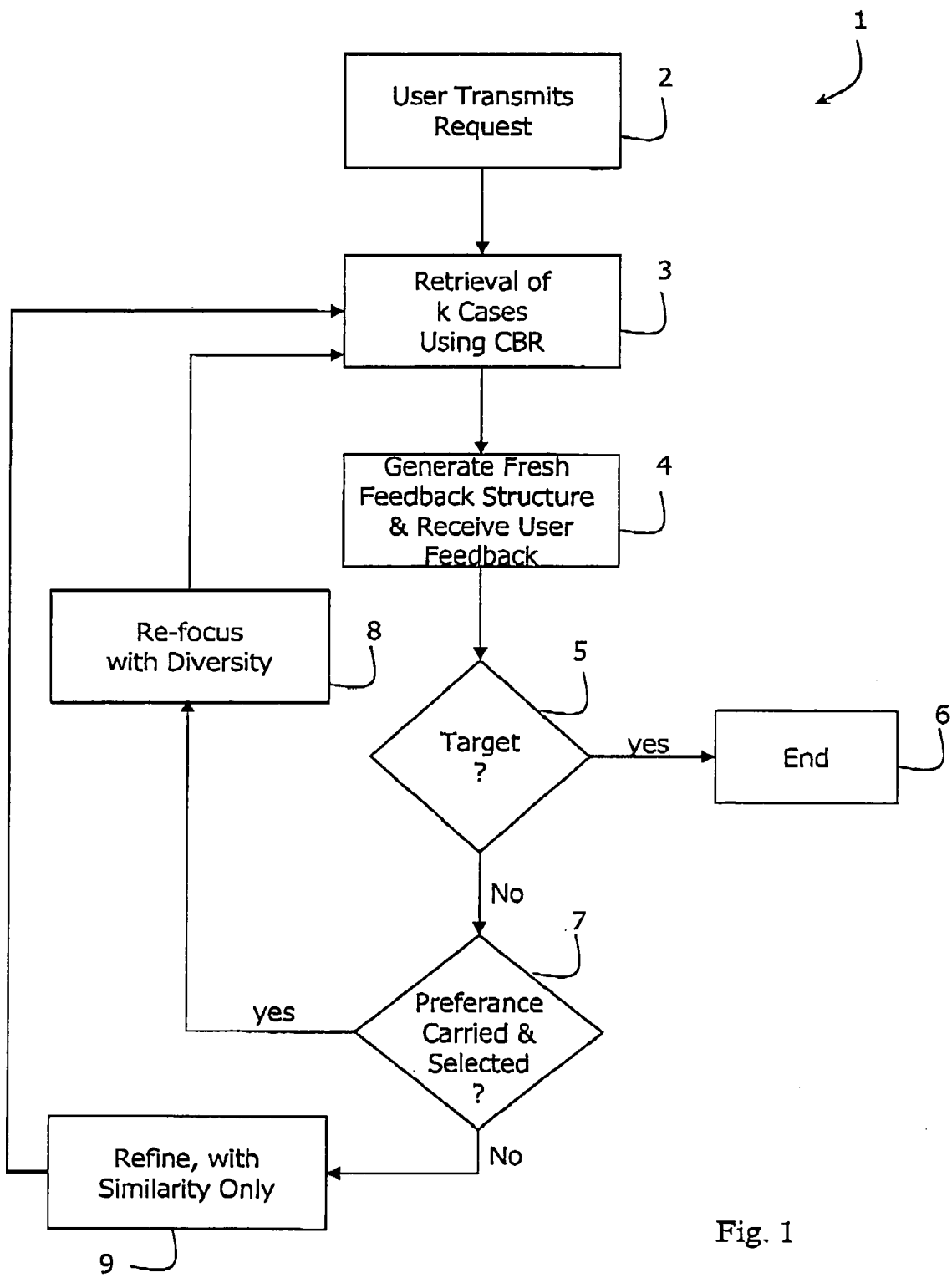
FIG. 1 is a flow diagram of a retrieval method of the invention.

Referring to FIG. 1, a recommender system of the present invention implements a retrieval method 1 for retrieving cases from a case base. In step 2, a user inputs a request with criteria for the search. The system recommends k cases in step 3, retrieving the k cases using case based reasoning (CBR), on the basis of a similarity approach. In step 4, the user reviews these cases and provides feedback by indicating which of a number of returned cases is preferred, or by indicating that the target case has been located. Also in step 4, a fresh feedback structure may be generated.

As indicated by the decision step 5, if the feedback indicates that the target case is located the method ceases in step 6. However, otherwise, in a decision step 7 the system checks if the user-preferred case is the same one as was indicated in the previous cycle (clearly, this will not be the situation for the first cycle), i.e. was the preference carried and re-selected? The system determines if the preference has been carried and re-selected by comparing feature values provided in the step 4 with the case base. If the preference has been carried and re-selected, the system in step 8 re-focuses for performing the next retrieval with a diversity-enhanced similarity approach ("diversity"). If the preference has not been carried the system refines with the similarity approach only for the next retrieval. This dynamic selection of the selection mechanism is referred to as "adaptive selection" or "AS". The system then performs retrieval in step 3 to commence the next cycle.

Thus, in each cycle after the first there is adaptive selection of the optimum retrieval technique, on the basis of the user preference. This achieves a large improvement in efficiency as set out in detail below. A major advantage of the invention is that this dramatic improvement is achieved in a very simple manner. The retrieval tools and mechanisms are already available in existing retrieval systems, and no further user input is required. The invention can be performed with any appropriate retrieval technology such as case based reasoning (CBR) or any other technology to which similarly and diversity-enhanced similarly techniques can be applied.

Adaptive selection achieves a more sophisticated recommendation strategy that is capable of adjusting the balance of similarity and diversity during each recommendation cycle of a session. It determines whether or not the session is correctly focused by determining whether the recent recommendations represent an improvement on those made in the previous cycle. This is achieved by making two modifications to the known comparison-based automatic recommendation technology where a fixed number (i.e. k) of cases are presented to the user in each recommendation cycle, and the user is invited to provide feedback on how these suggestions relate to their requirements First, instead of making k new recommendations in each new cycle, the current preference case is added to k−1 new recommendations. We refer to this as carrying the preference ("CP"). On its own this modification introduces redundancy, because a previously seen case is repeated in one or more future cycles. However, including the previous preference makes it possible to avoid the problems that ordinarily occur when none of the newly recommended cases are relevant to the user. The step of determining if the preference case has been carried does not involve additional inputs by the user. The user, as before provides feedback by specifying particular preferences for target case feature values, indicating preferred ranges of values (critiquing feedback), by indicating a preferred case (preference-based feedback), or by rating results.

Also, carrying the preference allows the system to automatically judge the focus of the recommendation. If the user prefers a case other than the carried preference, then it must be because it is closer to the target, and thus positive progress has been made. In this situation diversity is not warranted and the emphasis should be on similarity in the next recommendation cycle. If, however, the user prefers the carried preference case then it suggests that the other k−1 cases are less relevant than the carried case, and thus that the recommender has failed to make positive progress towards the target. In this situation two things happen. First, diversity is introduced into the next recommendation cycle. And secondly, during the selection of the new cases for the next recommendation cycle, the dissimilarity, of these candidate cases to the rejected cases is taken into account. The system prioritises cases that are not only similar to the query, but also dissimilar from the rejected cases. This is achieved by using the formula given below in Equation 1, where c is a candidate case, $c_p$ is the current preferred case, and C' is the set of k−1 rejected cases.

$$SimDissim(c, c_p, C') = \frac{Sim(c, c_p) + \sum_{\forall c_i \in C} (1 - Sim(c, c_i))}{K} \quad (1)$$

The following sets out the algorithm for implementing steps 3, 7, 8, and 9 of the method 1.

1. define ItemRecommend(q, CB, k, $i_p$, $i_{p-1}$)
2. begin
3. if($i_p$ !=null) && ($i_p$==$i_{p-1}$)
4. R'←ReFocus(q, CB, k−1)
5. else
6. R'←ReFine(q, CB, k−1)
7. R←R'+$i_p$
8. return R
9. end
10. define ReFine(q, CB, k)
11. begin
12. CB'←sort CB in decreasing order of their sim to q
13. R←top k items in CB'
14. return R
15. end
16. define ReFocus(q, CB, k, $i_p$, $i_{p-1}$)
17. begin
18. α=0.5 CB'←sort CB in decreasing order acc to Equation 2
20. return BoundedGreedySelection(q, CB, k, b, α)
21. end The components in this algorithm implement adaptive selection in comparison-based recommendation with preference-based feedback. The ItemRecommend function must first check whether the carried preference case ($i_{p-1}$) has been selected by the user as their preference (i.e. $i_{p-1}$=$i_p$). If it has then the Refocus function is called to select a set of k−1 diverse cases (step 8) for the next cycle; they will be added to the preference case to make up the k cases for the next cycle. If, on the other hand, the carried preference has not been selected (i.e. $i_p-1 \neq i_p$) then the Refine function is called (step 9) to help the recommender home in on the region of this recent preference in the hope that this region is occupied by the ideal target case.

The bounded-greedy technique involves two basic phases. First, the bk most similar items to the query are selected (where b is typically an integer between 2 and 5). During the second phase, the set (R) of selected items is built incrementally. During each step of this build the remainder of the bk items are ordered according to their quality and the highest quality item added to R. The quality of an item i is proportional to the similarity between i and the current query q, and to the diversity of i relative to those items so far selected, R={$r_1$, ..., $r_m$}; see Equations 2 & 3.

$$Quality(q,i,R) = \alpha * SIM(q,t) + (1-\alpha) * Div(i,R) \quad (2)$$

$$Div(i, R) = 1 \text{ if } R = \{\}; \quad (3)$$
$$\frac{\sum_{j=1...m} (1 - Sim(i, r_j))}{m} \text{ otherwise}$$

The description above briefly mentions "critiquing" as a manner of the user providing feedback in step 4. This is a form of feedback that expresses what might be termed a directional feedback over a particular item feature. Each critique or tweak is a constraint over the value-space of a particular feature. For example, the user might indicate that they are looking for a less expensive restaurant or a more formal setting. These are two individual tweaks: the former on the price feature and the latter on the setting feature. The advantage of critiquing is that the user does not need to provide specific value information for a feature, while at the same time helping the recommender to narrow its search focus quite significantly.

Dynamic Compound Critiquing

Each recommendation session is initiated by an initial user query as in step 2 and this will result in the retrieval of the most similar case available for the first recommendation cycle. The user will have the opportunity to accept this case, thereby ending the recommendation session in step 6, or to critique this case. When they critique the case, the critique in question acts as a filter over the remaining cases, and the preference case chosen for the next cycle is that case which is compatible with the critique and which is maximally similar to the previously recommended case.

To critique a case the user will be presented with a feedback structure including a range of single-feature (unit) critiques plus a set of compound critiques that have been chosen because of their ability to carve-up the remaining cases. We refer to our approach as dynamic critiquing. The unit critiques allow the user to specify a range for individual features such as a range of resolutions for a camera. A compound critique is a combination of two or more features in a unit, and the user is given the opportunity to choose the compound critique. An example is "less memory and lower resolution and cheaper: Yes/No".

This allows conversational recommender system to generate new opportunities for feedback for the user in a dynamic fashion. Essentially, during each cycle the system looks at the cases that remain and identifies groups of features that may be grouped together and presents these to the user as an optional form of feedback. It discovers these groups of features by executing a data-mining process.

Critique Patterns

Let us assume that the recommender system is currently engaged in a recommendation session with a user, and that a new case has been returned as part of the current cycle. Each case that remains in the case base can be compared to this new case to generate a critique pattern. This pattern essentially recasts each case in the case base in terms of the unit critiques that apply to each of its features when compared to the current case.

Table 1 below illustrates this with the aid of an example. It shows the current case that has been selected for recommendation to the user as part of the current cycle and also a case from the case-base. The current case describes a 1.4 GHz, desktop PC with 512 Mb of RAM, a 14" monitor and a 40 Gb hard-drive, all for 1500 euro. The comparison case, from the case base, describes a 900 MHz, desktop with 512 MB or RAM, a 12" monitor and a 30 Gb hard-drive for 3000 euro. The resulting critique pattern reflects the differences between these two cases in terms of individual feature critiques. For example, the critique pattern shown includes a "<" critique for processor speed—we will refer to this as [Speed<]— because the comparison case has a lower processor than the current recommended case. Similarly, the pattern includes the critique [Price>] because the comparison case is more expensive than the current case. So, prior to the discovery process, and after a case has been selected for the current cycle, it is necessary to generate a critique pattern for every case in the case base relative to the current case. These patterns serve as the source of compound critiques.

TABLE 1

| | Current Case | Case c from CB | Critique Pattern |
|---|---|---|---|
| Manufacturer | Compaq | Sony | != |
| Monitor (inches) | 14' | 12' | < |
| Memory (MB) | 512 | 512 | = |
| Hard-Disk (GB) | 40 | 30 | < |
| Processor | Pentium 3 | Pentium 3 | = |
| Speed (Mhz) | 1400 | 900 | < |
| Type | Desktop | Desktop | = |
| Price | 1500 | 3000 | > |

Discovering Compound Critiques

The system exploits compound critiquing by recognising useful recurring subsets of critiques within the potentially large collection of critique patterns (the pattern-base). Certain subsets will tend to recur throughout the pattern-base. For example, 50% of the remaining cases may have a smaller screen-size but a larger hard-disk size than the current case; that is, 50% of the critique patterns contain the sub-pattern {[Monitor <], [Hard-Disk >]}. If this critique is applicable to the user—if they are in fact looking for smaller screens and larger hard-disks—then its application will immediately filter out half of the remaining cases, thus better focusing the search for a suitable case during the next cycle. Presumably, neither of the individual critiques that make up this compound critique would wield the same discriminatory power on their own.

Figure 1A:
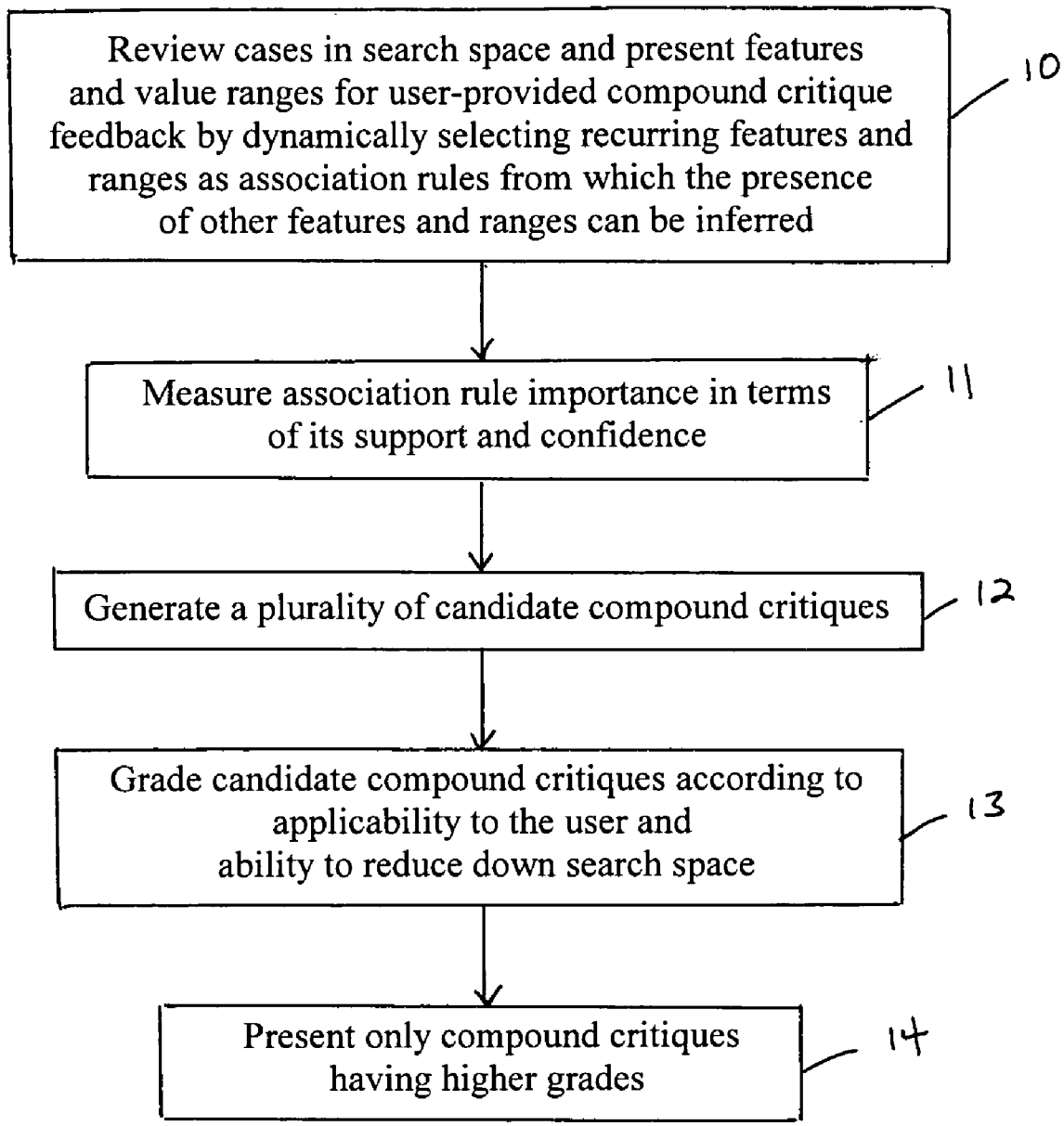
FIG. 1A is a flow diagram expanding step 3 of FIG. 1.

The system finds sets of critiques that frequently occur together. This is a challenging task, largely because of the combinatorics involved: a typical supermarket will have several thousand different products and this can lead to a combinatoric explosion in the number of possible groups of recurring items. This problem is not so acute in the above critiquing scenario because there are only a limited number of possible critiques. For instance, each numeric feature can have a < or a > critique and each nominal feature can have a= or a !=critique, so there are only 2n possible critiques in a case-base where the cases are made up of n individual features. To handle more complex situations the system executes efficient algorithms for the possible compound critiques to be checked. One such algorithm is the Apriori algorithm which, as summarized in FIG. 1A, characterises these recurring item subsets as association rules of the form A→B—from the presence of a certain set of critiques or value ranges (A) it can infer the presence of certain other critiques or value ranges (B), step 10. For example, one might learn that from the presence of the critique, [Monitor <], we can infer the presence of [Hard-Disk ] with a high degree of probability; in other words the pattern {[Monitor <], [Hard-Disk >]} is commonplace.

Apriori measures the importance of a rule in terms of its support and confidence, step 11. The support of a rule, A→B, is the percentage of patterns for which the rule is correct; that is, the number of patterns that contain both A and B divided by the total number of patterns. Confidence, on the other hand, is a measure of the number of patterns in which the rule is correct relative to the number of patterns in which the rule is applicable; that is, the number of patterns that contain both A and B divided by the number of patterns containing A. For instance, we would find that the rule [Monitor <]→[Hard-Disk >] has a support of 0.1 if there are a total of 100 critique patterns but only 10 of them contain [Monitor <] and [Hard-Disk >]. Likewise, the confidence of this rule would be 0.4 if 25 of the critique patterns contain only [Monitor >]. Apriori is a multi-pass algorithm, where in the $k^{th}$ pass all large itemsets of cardinality k are computed. Initially, frequent itemsets are determined. These are sets of items that have a least a pre-defined minimum support. Then, during each new pass those itemsets that exceed the minimum support threshold are extended.

The system uses Apriori, during each recommendation cycle in step 3, to generate a collection of compound critiques (frequent itemsets over the pattern-base), for user feedback in step 4. It then selects a subset of these compound critiques so that they may be presented to the user as alternative critiquing options.

Grading Compound Critiques

During any particular cycle a large number of candidate compound critiques, of varying sizes, may be discovered or generated, step 12. Of course it is not feasible to present all of these to the user, and so the system chooses a select subset by grading a plurality of candidate compound critiques, step 13, and presenting to the user only the compound critiques having higher grades, step 14. Which subset it chooses is likely to have a significant bearing on the degree to which the compound critiques may prove to be successful at reducing session length. There are two main criteria in this regard:

- It presents compound critiques that are likely to be applicable to the user, in the sense that they are likely to constrain the remaining cases in the direction of their target case. This way there is a good chance that these compound critiques will be selected over any of the unit critiques.
- It presents compound critiques that will filter out large numbers of cases (reduces the search space), step 13, so that there is a greater chance that the target case will be retrieved in the next cycle.

Regarding the first of these criteria it is likely that certain features of the target case may be inferred from the feedback provided during previous cycles. For example, if the user reliably looks for cheaper PCs, then compound critiques that contain [Price <] may be a good candidates. The second criterion is more straightforward to address. The support of a compound critique is a direct measure of its ability to filter out few or many cases. A compound critique with a low support value means that it is present in a small proportion of critique patterns and thus it is only applicable to a few remaining cases. If applied, the critique will therefore eliminate many cases from consideration.

There is a tension between the use of support as a grading metric for compound critiques and the way that it will influence the above criteria. While low-support critiques will eliminate many cases, these critiques are probably less likely to lead to the target case, all things being equal. Conversely, preferring high-support critiques will increase the chance that the critiques will lead to the target case, but these critiques will fail to eliminate many cases from consideration.

Figure 2:
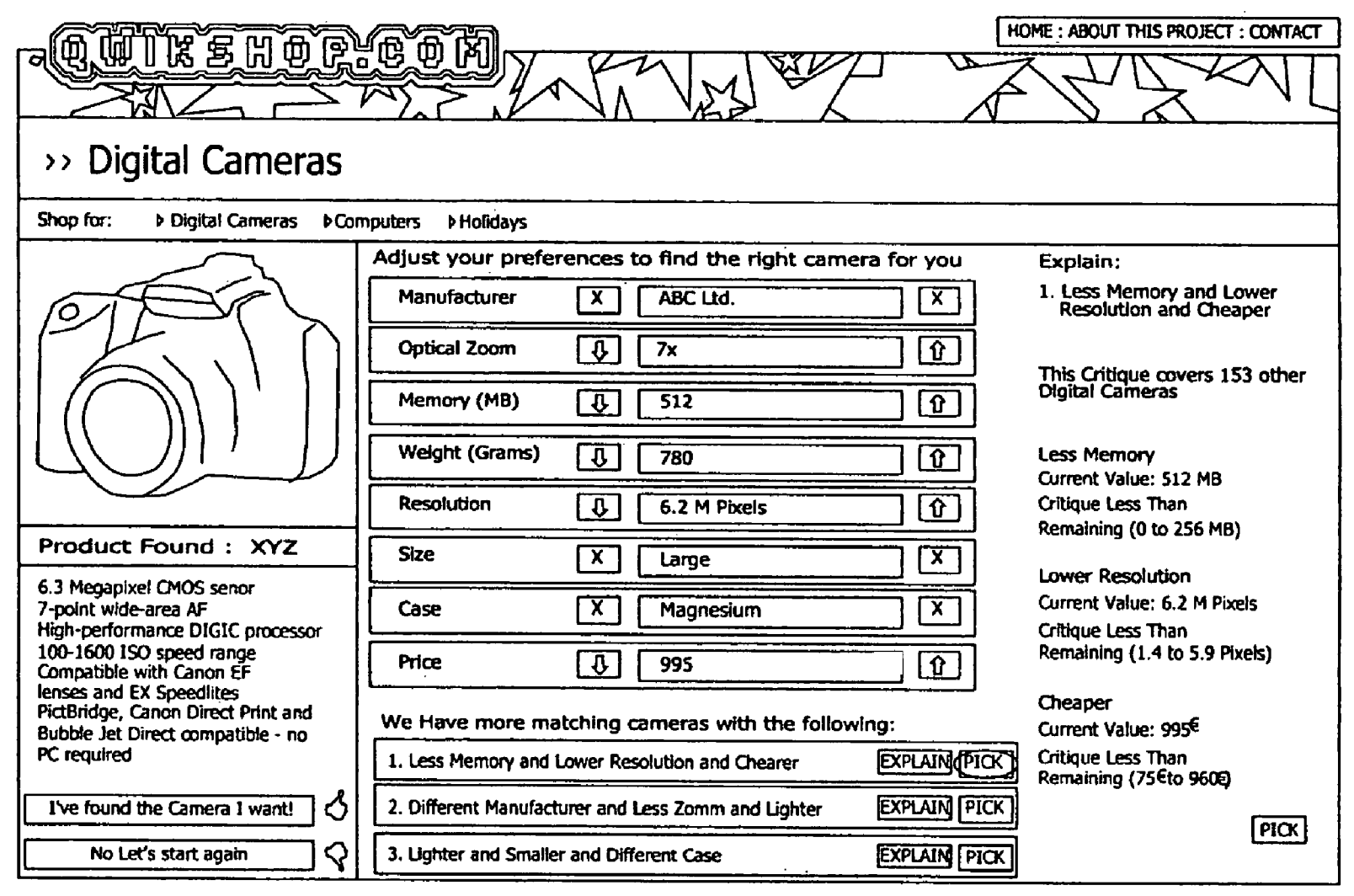
Figure 3:
Figure 4A:
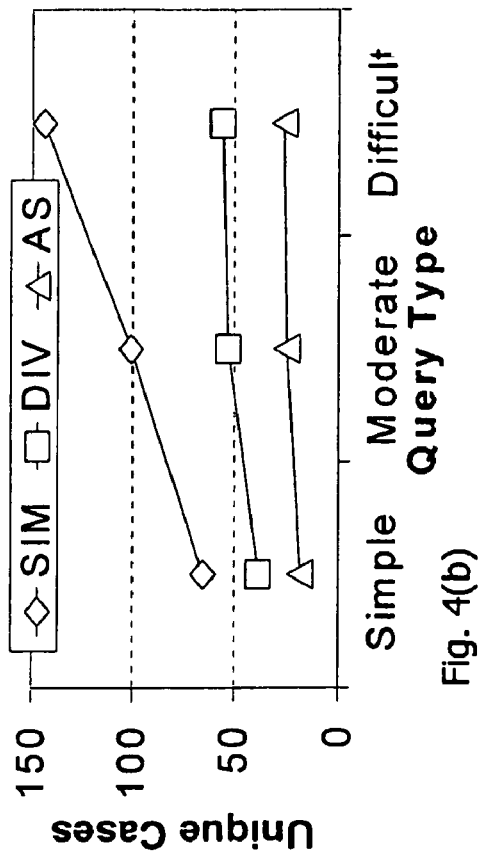
Figure 4C:
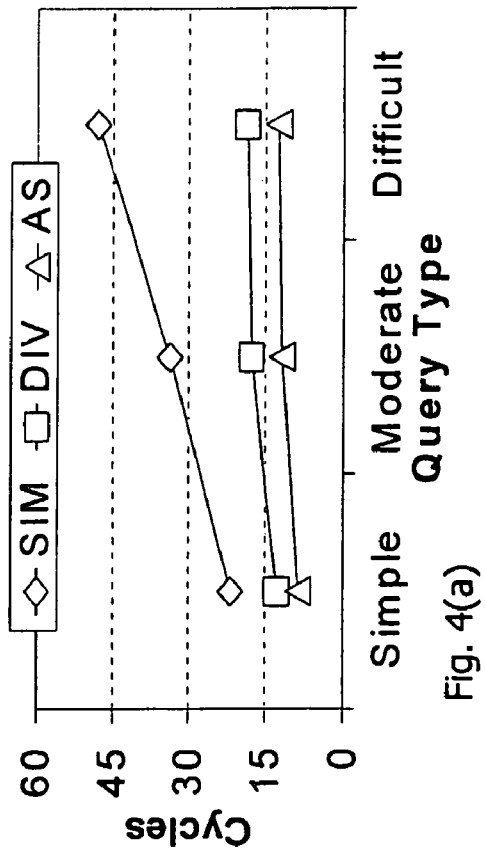
Figure 4B:
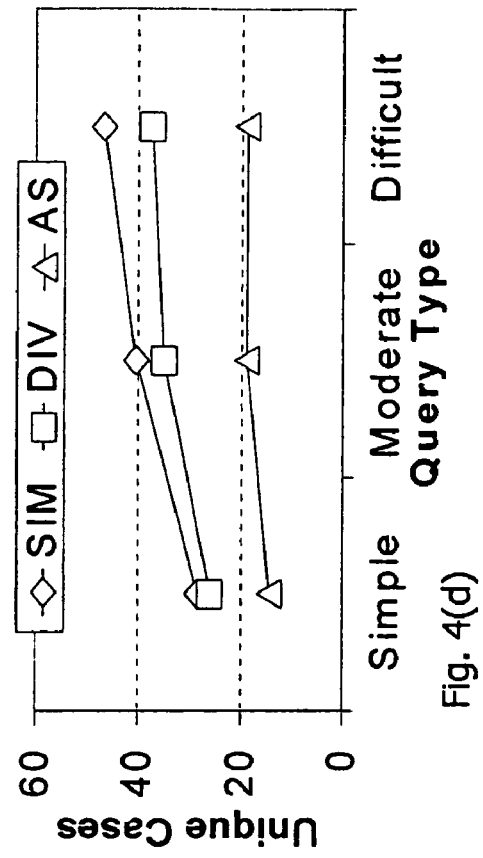
Figure 4D:
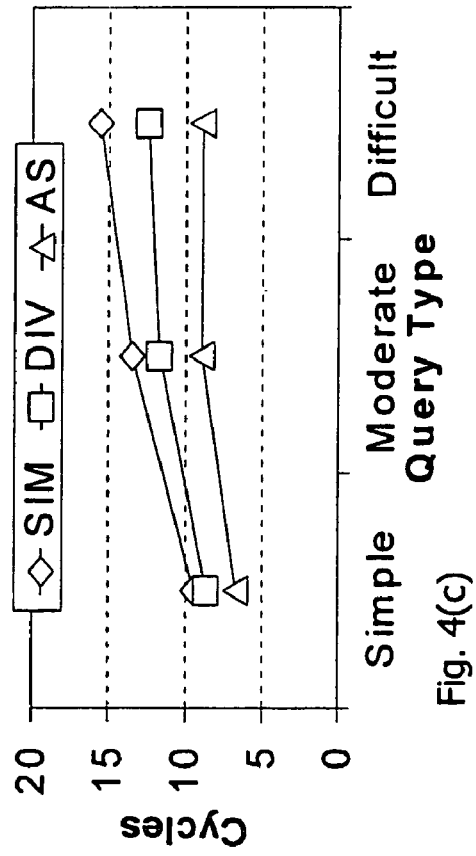
Figure 5B:
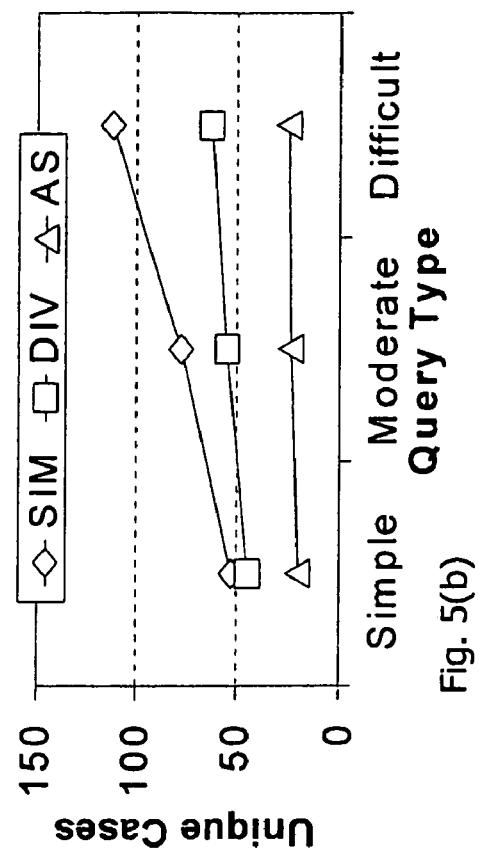
Figure 5D:
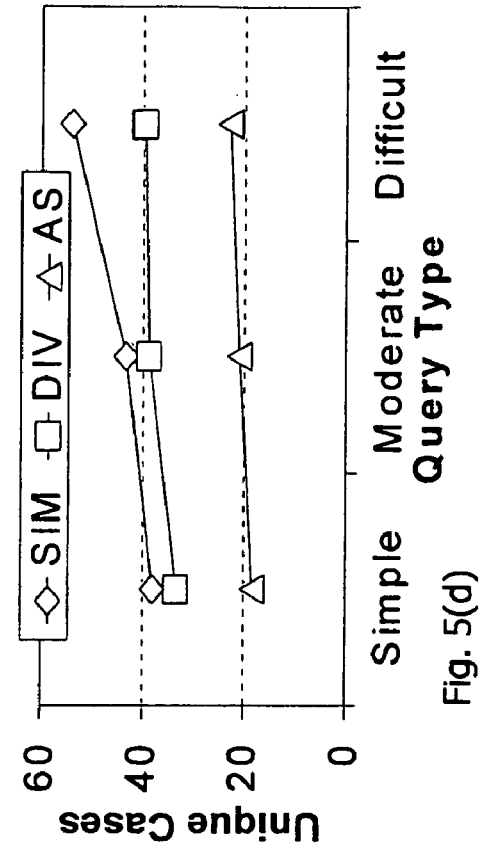
Figure 5A:
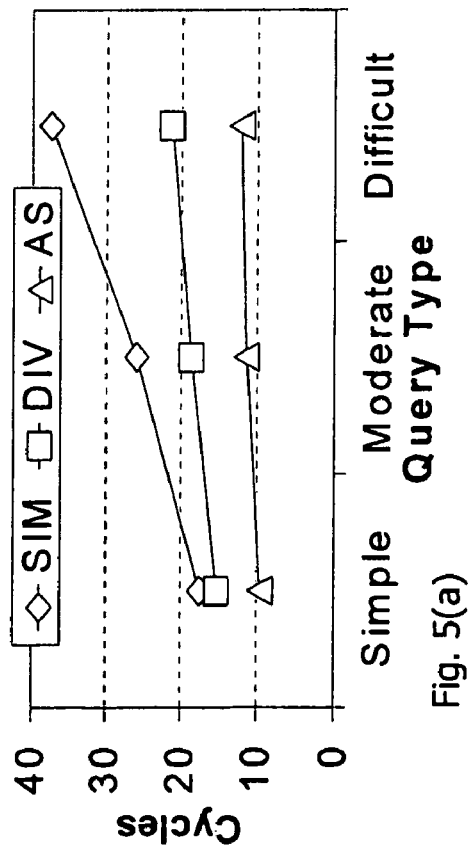
Figure 5C:
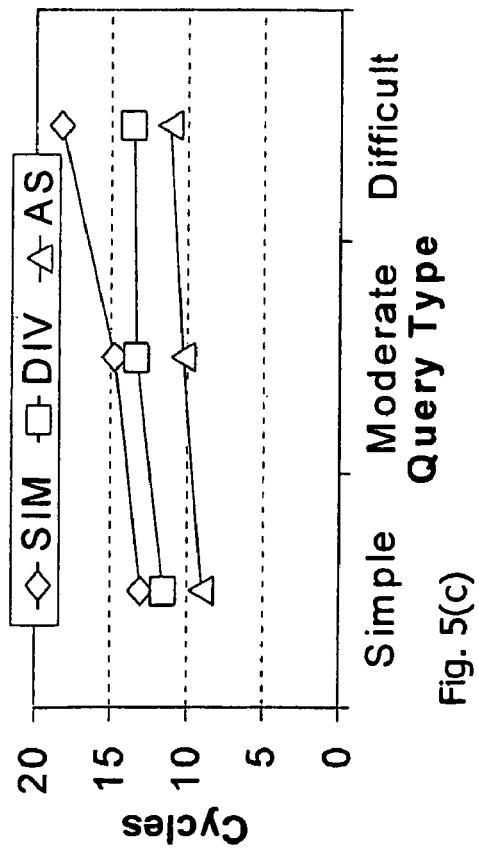
Figure 7A:
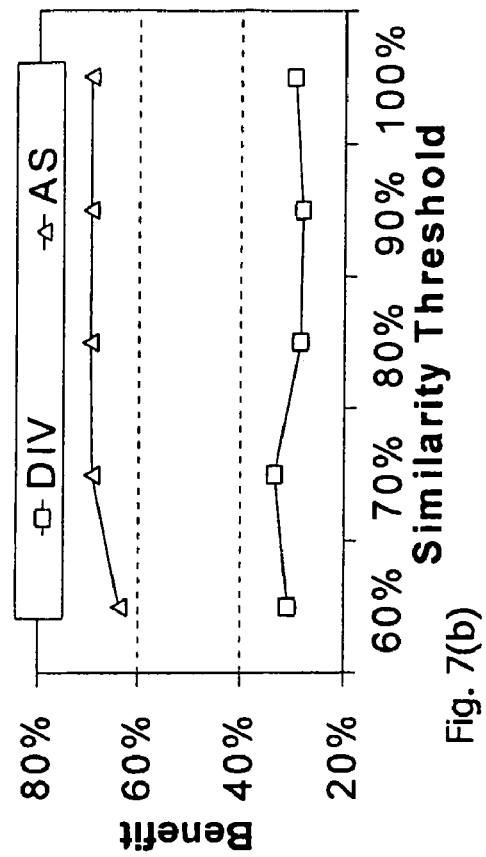
Figure 7B:
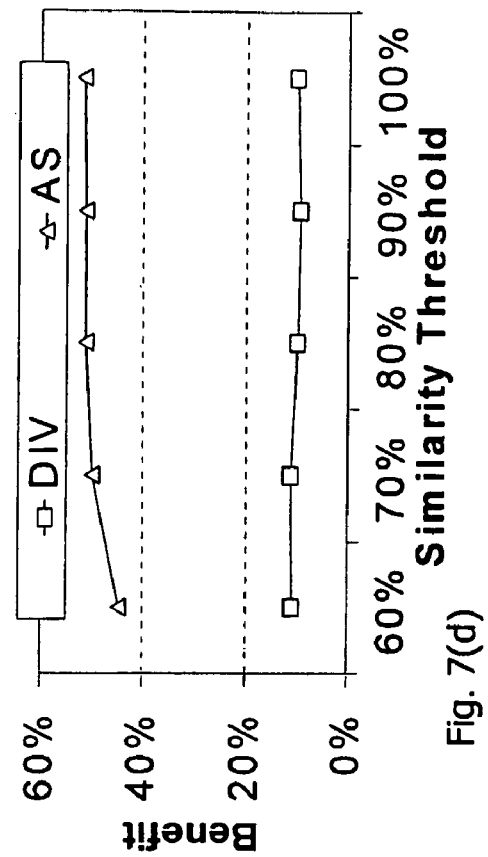
Figure 7C:
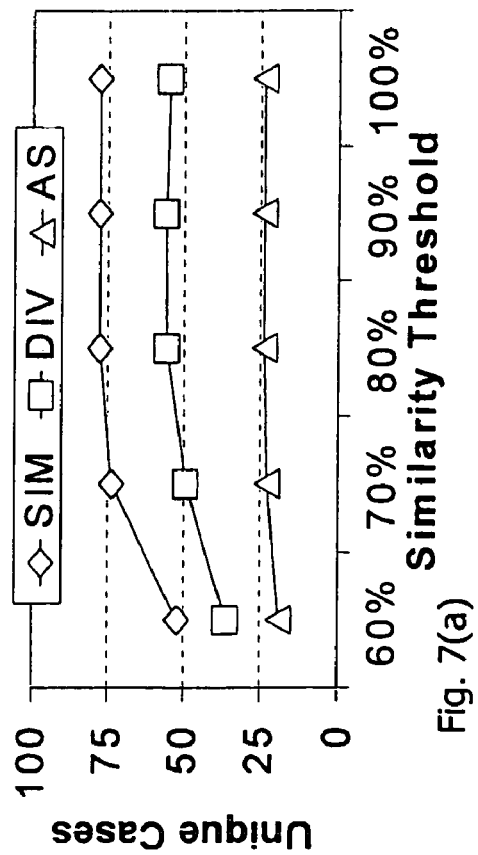
Figure 7D:
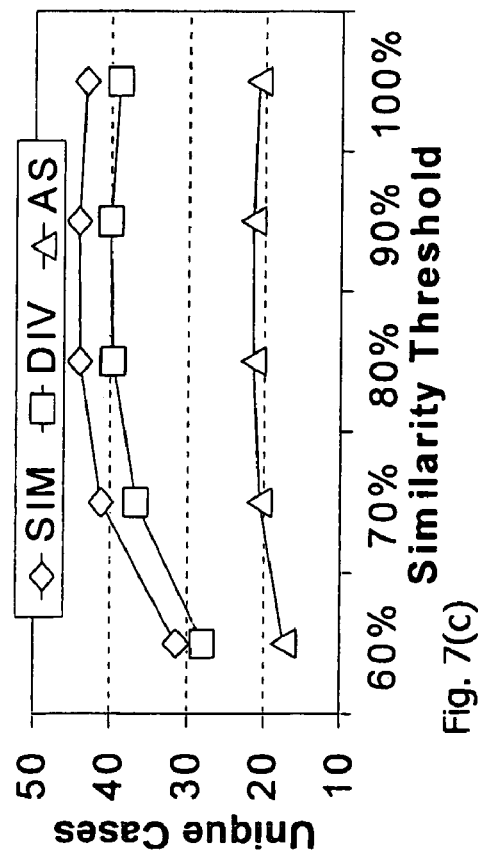

Referring to FIGS. 2 and 3 dynamic critiquing is illustrated with a series of two screenshots for purchasing a digital camera from an online digital camera store, using a data processing computer system conventionally equipped with a display monitor and an input device. The screenshots present a sequence of recommendation cycles and in each we see the currently preference case, a set of eight critiques, plus a set of three compound critiques, and their associated explanations. Each compound critique is translated into an English explanation and can be chosen directly (via the 'pick' option) or elaborated further (via the 'explain' option).

After the user has provided some initial information they are presented with a high-end camera for 995 euro with 512 Mb of memory and a ×7 optical zoom. The user can critique any of the individual features, such as {manufacturer, optical zoom, or memory} by selecting the appropriate critique icon on either side of the feature value fields that are displayed for the current camera. The up-arrow indicates a greater-than critique, down-arrow indicates a less-that critique and the cross indicates a not-equal-to critique. In addition, just below these features, three compound critiques are displayed and the user can either select one of these to be applied directly (the 'pick' option) or they can request a more detailed explanation via the 'explain' option. This explanation is presented in the pane to the right of the feature values, and defaults to be an explanation of the first compound critique.

For example, in FIG. 3 the user asks for further explanation of the third compound critique ("Different Manufacturer, Lower Resolution and Cheaper"). The resulting explanation tells the user that there are 87 remaining cameras that satisfy this critique—that is, there are 87 cameras that are cheaper, with a lower resolution, and made by a different manufacturer, than the currently recommended camera. In addition, the explanation provides information about the ranges of values for these critiqued features. For instance, the user is told that these 87 cameras are made by specified manufacturers, that they have resolutions from 1.4 to 4.8 million pixels, and that their price ranges from 125 to 399 euro. The compound critiques have a valuable role to play in explanation. Compound critiques help the user to better understand the recommendation opportunities that exist beyond the current cycle by helping them to appreciate common interactions between features. We believe that in many recommender domains, where the user is likely to have incomplete knowledge about the finer details of the feature-space, that compound critiques will help to effectively map out this space. For this reason we believe that users will actually find it easier to work with compound critiques, and their associated explanations, than unit critiques and this may, for example, help the user to make fewer critiquing errors. For instance, with standard critiquing in the digital camera domain a user might naively select the [Price <] unit critique in the mistaken belief that this may deliver a cheaper camera that satisfies all of their other requirements. However, reducing price in this way may lead to a reduction in resolution that the user might not find acceptable and, as a result, they will have to backtrack. This problem is less likely to occur if the compound critique {[Price <], [Resolution <]} is presented because the user will come to understand the implications of a price-drop prior to selecting any critique.

Experiment

Setup

Algorithms. We wish to test three basic conversational recommendation strategies: (1) SIM—a pure similarity-based recommender that serves as a benchmark; (2) DIV—a recommender that adopts the uniform diversity enhancing technique described above; and (3) AS—an equivalent recommender that adopts the adaptive selection technique of FIG. 1. In addition, we wish to test these recommender systems using two different types of user feedback: preference-based feedback and critiquing. This gives six different recommender systems to test—SIM, DIV, and AS with preference-based feedback and SIM, DIV and AS with critiquing—each implemented using the comparison-based recommendation framework.

Data-Sets

A Travel case-base contains 1024 cases, each describing a specific vacation in terms of features such as location, duration, accommodation, price etc. A Whiskey case-base contains a set of 552 cases, each describing a particular Scotch whiskey in terms of features such as distillery, age, proof, sweetness, flavour, finish etc.

Methodology

Using a leave-one-out methodology, each case in a case-base is temporarily removed and used in two ways. First it serves as the basis for a set of queries constructed by taking random subsets of item features. Here, different numbers of features are extracted for different queries and, in general, queries with more features are easier to solve than queries with few features. Second, we select the case that is most similar to the original base. These cases serve as the recommendation targets for the experiments. Thus, the base represents the ideal query for a user, the generated query is the initial query that the user provides to the recommender, and the target is the best available case for the user based on their ideal. Each generated query is a test problem for the recommender, and in each recommendation cycle the user's preference is assumed to be the case that is most similar to the known target case. Preference-based or critiquing is applied to this preference case as appropriate; in the case of the latter, a random critique is applied to the preferred case in each cycle. Finally, in our evaluation we set the recommendation window size k to be 3, being the most appropriate number of items to expect a shopper to decide between.

Test Queries

For each data set, three different groups of queries are generated of varying degrees of difficulty (easy, moderate, difficult). Difficulty is based on the number of cycles required by SIM with preference-based feedback.

Recommendation Efficiency

Perhaps the most basic test of a conversational recommender system concerns its recommendation efficiency; that is, the length of the recommendation dialog for a typical query. Dialog length can be measured in terms of the number of cycles, or the number of unique cases presented, during the dialog. As such, to test recommendation efficiency the leave-one-out method outlined above is used for each query from both data sets across the three recommenders and the average number of cycles and unique items presented to the user are measured.

Results

The results for Travel and Whiskey are summarised in FIGS. 4 and 5 respectively. In each case, graph (a) and (b) relate to preference-based feedback and (c) and (d) relate to critiquing. Graphs (b) and (d) measure efficiency in terms of unique cases—the cycles data has been omitted for space reasons—but graphs (a) and (c) include both unique cases and cycles information in terms of the percentage benefit enjoyed by DIV and AS methods relative to the SIM benchmark.

Analysis

A number of issues are clarified by these results. Firstly, a significant efficiency benefit is enjoyed by DIV and AS, when compared to SIM, in both data-sets, across all query types, and for both types of feedback. For example, using preference-based feedback in Travel, for moderate queries, the SIM method presents the user with an average of about 100 unique cases before the target case is located. By comparison, the DIV method requires only about 53 cases and the AS method requires only 24 cases. Using critiquing in Travel, the equivalent results for SIM, DIV and AS are 40, 35 and 19, respectively. The corresponding relative benefits are shown in FIG. 4 for Travel with DIV experiencing a reduction in unique cases of 47% with preference-based feedback but only 13% for critiquing, relative to SIM. However, AS experiences corresponding reductions of 76% and 53% relative to SIM; similar benefits are presented in terms of the reduction in cycles. Comparable results are also presented in FIGS. 4(a-c) for the Whiskey data-set.

These results demonstrate that there is a benefit to introducing diversity into conversational recommender systems, but they also show that the straightforward DIV approach is suboptimal compared to AS. Indeed, in both data-sets, the recommenders that employ critiquing enjoy only a limited efficiency improvement (<26%) when using the DIV method, compared to SIM. In contrast, the AS method of the invention displays a much greater efficiency advantage, achieving maximum efficiency improvements in excess of 75% (in terms of unique cases) in both data-sets for preference-based feedback, and up to 60% in both data-sets for critiquing. It is also worth highlighting how the efficiency benefits enjoyed by DIV and AS, relative to SIM, are generally increasing with query difficulty in both data-sets and using both types of feedback.

Preference Tolerance

The above evaluation assumes that the recommendation dialog ends when the pre-determined target case is selected by the user. This is analogous to a user seeking out a very specific case. In reality users are likely to be more flexible in their acceptance criteria, often tolerating cases that are close to, but not an exact match for, their ideal target. To test this we repeat the above experiment but instead of terminating a recommendation dialog when the ideal target has been found, it is terminated once a case is found that is within a specific similarity threshold of the target. We test similarity thresholds from 60% to 100%; 100% corresponds to the previous setup where the dialog terminates with the optimal target case.

Results

The results for Travel and Whiskey are summarised in FIGS. 6 and 7 respectively; in each figure, graphs (a) and (b) relate to preference-based feedback, while (c) and (d) relate to critiquing. Also the graphs only present the results for queries of moderate difficulty; the results for the simple and advanced queries are broadly similar but omitted, once again, for space-saving reasons.

Analysis

The results are clear. The performance advantages enjoyed by DIV and by AS, relative to SIM, are once again found under less stringent success conditions. For example, in Travel with preference-based feedback, for moderate queries, we find that, on average, SIM expects users to look at about 61 unique cases at the 60% similarity threshold (compared to 100 cases at the 100% threshold). In comparison, under the same conditions, DIV and AS require the user to examine only 31 and 18 cases, respectively (see FIG. 6(a)), representing a reduction of about 49% for DIV and 71% for AS, relative to SIM. As the similarity threshold increases, so too does the number of unique cases that the user must examine before locating a satisfactory one. Interestingly, while the relative benefit enjoyed by DIV remains relatively constant for changing similarity thresholds, we find that the AS benefit increases with the similarity threshold. In other words, the ability of AS to improve upon the efficiency of SIM (or indeed DIV) increases as the success criterion becomes more stringent. These results for Travel with preference-based feedback are mirrored by equivalent results for Travel with critiquing (FIG. 6(a-d)). Likewise, the Whiskey results show a similar pattern (FIG. 7(a-d)).

It will be appreciated that the invention takes advantage of similarity and diversity in a more efficient manner, by automatically determining when best to increase selection diversity and when best to focus on query similarity. Moreover, we have shown that this approach enjoys significant performance improvements over prior similarity-based recommenders and the also the prior diversity enhancing techniques. For example, adaptive selection can reduce the number of unique cases that a user must examine by up to 80% in the case of preference-based feedback and by up to 60% in the case of critiquing.

The invention is not limited to the embodiments described but may be varied in construction and detail.

The invention claimed is:

1. A retrieval method carried out by a conversational recommender system, implemented using a programmable data processing apparatus, the method comprising the steps of:

executing a retrieval session comprising at least one retrieval cycle to execute a selection mechanism to retrieve recommended cases from a database in response to a user query and presenting the recommended cases to the user, using the programmable data processing apparatus;

receiving user feedback in the retrieval cycles, using the programmable data processing apparatus; and dynamically choosing a selection mechanism during each of the retrieval cycles, using the programmable data processing apparatus;

said step of dynamically choosing being made in each cycle on the basis of the user feedback for the cycle, and the dynamic choice being made between:

a refinement selection mechanism using case retrieval based on prioritizing cases which are similar to the query, and a re-focusing selection mechanism using case retrieval based on prioritizing cases which are similar to the query and are dissimilar from recommended cases which have not been preferred by the user in the user's feedback;

wherein in a current cycle which is a second or subsequent cycle of the session, the system carries a preference case by recommending again a case which was recommended in a previous cycle and was preferred in said previous cycle, and the system chooses:

the refinement selection mechanism if a different preference is indicated in the current cycle;

the re-focusing selection mechanism for implementing diversity if the same preference is again indicated in the current cycle;

wherein the choice is made on the basis of, where a preference case is carried from a previous cycle, whether the user again prefers the same case in the current cycle;

wherein the system requests the user to indirectly indicate a preferred case, by critiquing in which a range of values is indicated for a search feature;

wherein the system dynamically generates a fresh feedback structure for user feedback in each cycle of a session;

wherein the system reviews cases that remain in the search space for a session and identifies groups of features, and value ranges, and automatically presents the user with an option to indicate suitability of these features and value ranges for a compound critique feedback;

wherein the system dynamically selects said features and value ranges by characterizing recurring features and ranges as association rules A→B, in which from the presence of features, and value ranges A it infers the presence of other features and value ranges B;

wherein the system generates a plurality of candidate compound critiques, grades them, and presents to the user only compound critiques having higher grades; and wherein the candidate compound critiques are graded according to a criterion of applicability to the user and a criterion of ability to reduce down the search space.

2. The method as claimed in claim 1, wherein the system performs retrieval on the basis of case based reasoning.

3. The method as claimed in claim 1, wherein the selection is executed by a process which measures the importance of an association rule in terms of its support and confidence.

4. The method as claimed in claim 1, wherein the system generates an explanation for each compound critique presented to the user.

5. The method as claimed in claim 1, wherein the system generates an explanation for each compound critique presented to the user; and wherein the user is presented with the option of choosing a compound critique or requesting an explanation.

6. A recommender system implemented using a programmable data processing apparatus, comprising:

means executed by the programmable data processing apparatus for executing a retrieval session comprising at least one retrieval cycle to execute a selection mechanism to retrieve recommended cases from a database in response to a user query and presenting the recommended cases to the user;

means implemented using a programmable data processing apparatus for receiving user feedback in the retrieval cycles;

means implemented using a programmable data processing apparatus for dynamically choosing a selection mechanism during each of the retrieval cycles, said system being configured to make said choice on the basis of the user feedback for each of the retrieval cycles, and the dynamic choice being made between a refinement selection mechanism using case retrieval based on prioritizing cases which are similar to the query, and a re-focusing selection mechanism using case retrieval based on prioritizing cases which are similar to the query and are dissimilar from recommended cases which have not been preferred by the user in the user's feedback;

wherein in a current cycle which is a second or subsequent cycle of the session, the system carries a preference case by recommending again a case which was recommended in a previous cycle and was preferred in said previous cycle, and the system chooses:

the refinement selection mechanism if a different preference is indicated in the current cycle;

the re-focusing selection mechanism for implementing diversity if the same preference is again indicated in the current cycle;

wherein the choice is made on the basis of, where a preference case is carried from a previous cycle, whether the user again prefers the same case in the current cycle;

wherein the system requests the user to indirectly indicate a preferred case, by critiquing in which a range of values is indicated for a search feature;

wherein the system dynamically generates a fresh feedback structure for user feedback in each cycle of a session;

wherein the system reviews cases that remain in the search space for a session and identifies groups of features, and value ranges, and automatically presents the user with an option to indicate suitability of these features and value ranges for a compound critique feedback;

wherein the system dynamically selects said features and value ranges by characterizing recurring features and ranges as association rules A→B, in which from the presence of features, and value ranges A it infers the presence of other features and value ranges B;

wherein the system generates a plurality of candidate compound critiques, grades them, and presents to the user only compound critiques having higher grades; and wherein the candidate compound critiques are graded according to a criterion of applicability to the user and a criterion of ability to reduce down the search space.

7. The computer-implemented recommender system as set forth in claim 6, said system configured as a computer program executed on a data processing computer.

* * * * *